United States Patent Office 3,687,687
Patented Aug. 29, 1972

3,687,687
PRODUCTION OF READY-TO-EAT BREAKFAST CEREALS CONTAINING SOY FLOUR
Alexander L. Liepa, Cincinnati, Ohio, assignor to The Procter & Gamble Company, Cincinnati, Ohio
No Drawing. Filed June 29, 1970, Ser. No. 50,980
Int. Cl. A23l 1/10
U.S. Cl. 99—83   14 Claims

ABSTRACT OF THE DISCLOSURE

A novel high protein ready-to-eat cereal is produced containing soy flour. Soy flour having a protein content of about 40% up to 70% on a dry basis is made palatable by partially hydrolyzing it in the presence of a proteolytic enzyme and thereafter processing it to form a cold cereal product. Alternatively, a cereal grain such as corn, oats, wheat, or rice can be mixed with the partially hydrolyzed soy flour in such proportions that a cold cereal having a protein content greater than 20% is produced.

BACKGROUND OF THE INVENTION

This invention relates to novel food products of the breakfast cereal class and processes for their production. More specifically, the invention relates to breakfast cereals of the cold or ready-to-eat class, the two terms being used interchangeably. The breakfast cereals produced in accordance with the present invention are tasteful, have excellent eating qualities and are highly nutritious.

Prior attempts have been made to produce a breakfast cereal that is both tasteful and highly nutritious, i.e. for ready-to-eat cereals having a protein content of greater than 20%. Cereal grains such as corn, wheat, oats, and rice are quite tasteful and are commonly employed in producing a cold cereal product. Unfortunately, these cereal products are relatively low in their protein content and therefore not entirely satisfactory as a nutritious food product. Protein sources such as soy flour, wheat gluten, and milk protein have been incorporated into prior art cereal formulations in an attempt to increase their protein value while retaining the pleasant taste of the base grain. In particular, soy flour has been the object of much work, not only as a cereal additive but also as the base grain due to its high protein content and relative abundance. Unfortunately, the soybean possesses a rather unacceptable taste so that its use as a significant protein source in a cereal product has been limited because only at low levels of soy content and, accordingly, low protein content is the characteristic soy taste undetectable in a cold cereal product.

Various processes have been developed in an attempt to alleviate the taste problem associated with a soy-containing cereal and have met with limited success. For instance, some of the constituents of the soybean that are organolptically objectionable can be removed by an alcohol/water extraction process. Sugar coatings and various flavor additives also have been used to mask the rather bitter characteristic soy flavor.

Prior art cold cereal products containing a significant amount of soy also have drawbacks in addition to the aforementioned bitter taste of the soy. Eating quality of a cereal, as reflected by its crispness and tenderness, is also an important consideration. As used herein, crispness refers to the presence of a solid crunchy structure that can be detected while eating the cereal. The lighter and more frangible the structure the more crisp it is. The maximum degree of crispness of a cereal product is detected prior to being contacted with an aqueous liquid. After wetting with the aqueous liquid crispness steadily decreases with time until eventually a soggy and unacceptable product results. Sugar coatings on the individual cereal particles assist somewhat in maintaining the initial crispness of the cereal but sugar itself is soluble in the aqueous liquid, e.g. milk or cream, and therefore has only a temporary effect on the crispness or eating quality of the cereal. By the time the average consumer has gotten to the last portion of a breakfast cereal serving, the cereal has noticeably lost its initial crispness. Various edible hydrophobic materials such as animal or vegetable fats or oils have also been used in cold cereal formulations and as cold cereal particle coatings but they too are not fully satisfactory in alleviating the ready loss of crispness upon exposure to an aqueous liquid.

Another aspect of a cereal's eating quality, as above mentioned, is its tenderness. Soy-containing cereals traditionally are not tender. Tenderness, in this context, refers to the ease with which the cereal particle breaks down in the mouth. In this regard a cold cereal product can be deficient by being too hard or by being too tough. Generally a cereal becomes more tender when it soaks in an aqueous liquid such as milk. However, high soy protein-containing cereals become tough or leathery when soaked in an aqueous liquid with the result that the cereal product is not tender when eaten and, hence, objectionable to the average consumer.

Still another drawback experienced with the use of soy in a breakfast cereal encountered in "puffed" products is the adverse effect soy exerts on the puffability of a cereal particle. Ready-to-eat breakfast cereals are produced in many forms and shapes such as flakes, puffed cereal pieces, biscuits, granules, shreads and the like. A part of the process of producing the flake and puffed form involves what is referred to as a puffing operation. During puffing relatively dense flakes and particles are converted into more porous and light flakes and particles by causing trapped moisture to expand very rapidly from the liquid state to the vapor phase. Soy hinders this change in structure and thereby indirectly affects also the eating quality of the cereal since well-puffed cereals are more crisp and tender than poorly puffed cereals.

Heretofore, ready-to-eat cereal products containing soy as the protein source, e.g. some containing up to 85% soy flour, have been produced but all have generally met with limited receptivity by the consumer. Poor taste, poor eatinq qualities and with certain cereal forms, poor puffability have all contributed to the undesirability of soy in a ready-to-eat breakfast food.

It is the object of this invention to produce a high protein, soy-containing cold cereal product which is free from objectionable soy taste, which retains its crispness for a reasonable length of time after exposure to an aqueous liquid, and which is tender.

It is also an object of this invention to provide a novel process of producing a soy-containing cereal having the above referred to attributes by a method free of puffing problems where puffing is employed.

These and other objects will become apparent from the following description of the invention.

SUMMARY OF THE INVENTION

Briefly stated, this invention concerns the production of nutritious and tasteful breakfast cereal products having a protein content of at least 20%. More specifically, soy flour is made more palatable by partially hydrolyzing it in the presence of a proteolytic enzyme and thereafter processing it to form a ready-to-eat breakfast cereal. A preferred method of processing comprises extruding the partially hydrolyzed soy flour, pelletizing the extrudant, flaking the pellets, and puffing the flakes to produce a high protein breakfast food.

In another aspect of the invention, a cereal grain is added to the partially hydrolyzed soy flour and the resultant dough is processed into a final form suitable for human consumption.

DESCRIPTION OF THE INVENTION

In the present invention there are produced high protein content cold cereal products that are produced in any shape or form desired such as shredded, puffed, crumbled, biscuit, granule, flaked, and the like. Proteolytic enzyme-treated soy flour or meal, the two terms used interchangeably, provides the major source of protein and comprises a significant portion of the final cereal product. Alternatively, a cereal grain selected from the group consisting of corn, rice, oats, wheat and mixtures thereof are added to the enzyme-treated soy flour and processed to a final form suitable for consumption.

As used herein, soy flour refers to defatted and refined soybeans. Soy flour currently commercially available contains 40% to 60% protein on a dry weight basis and is to be contrasted with soy protein concentrate and soy protein isolate which contain at least 70% and 90% protein on a dry weight basis, respectively. As used herein, soy flour contains on a dry weight basis 40% up to 70% protein. The production of ready-to-eat cereal products containing soy protein isolate and soy protein concentrate are disclosed in commonly assigned, concurrently filed herewith Ser. No. 50,924, High Protein Ready-to-Eat Breakfast Cereals Containing Soy Isolate by William T. Bedenk, and Ser. No. 50,925, High Protein Ready-to-Eat Breakfact Cereals Containing Soy Concentrate, by William T. Bedenk, respectively. Soy protein isolate and concentrate have higher protein contents than does soy flour and hence they permit a greater latitude in the formulation of a high protein cold cereal product. The characteristic soy taste also is less pronounced in the soy protein isolate and concentrate than in the soy flour. Soy flour, though, is the cheapest of the three soy protein sources and can be processed into an acceptable nutritional food product.

Soy flour is commercially available and the processing of soybean to defatted soy flour forms no part of the present invention. Such processing methods are well known as evidenced by Soybeans and Soybean Products, vol. 1, 1950 by Klare S. Markley, Interscience Publishers, Inc.

In accordance with this invention, soy flour is made palatable by first subjecting it to a partial hydrolysis. Such an operation has a very pronounced effect on the tenderness and crispness retention of the final product. In the absence of such a treatment a very unacceptable cold cereal results, i.e. the product becomes tough and chewy upon exposure to milk and loses its initial crispness.

The partial hydrolysis of soy flour in the present invention is accomplished by mixing the soy flour, enzyme and water for a length of time at an elevated temperature. Proteolytic enzymes are instrumental in promoting the hydrolysis of proteins and have been used for such purposes heretofore. Unexpectedly, when soy flour is reacted with water in the presence of a proteolytic enzyme and thereafter processed into a cold cereal product the product that results is more tender with less tendency to develop toughness and has greater crispness retention than does a cold cereal product containing soy that has not been subjected to a partial hydrolysis reaction. The reason for this phenomena is not known and could not be predicted. Surprisingly, the cereal products of the present invention have a better eating quality as a result of the protein hydrolysis reaction.

The enzymes used in the present invention cause a partial hydrolysis of proteins and are to be contrasted with other types of enzymes such as amylolytic, lipolytic, or sucroclastic enzymes. Proteolytic enzymes attack proteins causing a hydrolysis of the peptide bonds of the polypeptide chains that make up the protein molecule. Unexpectedly, when a protein source is subjected to a partial hydrolysis, i.e. the protein molecule is only partially digested, and thereafter processed into a cold cereal product there results a product having superior crispness and tenderness retention properties.

A degree of hydrolysis of the soy flour in excess of that experienced under the conditions set out hereinafter results in a product having an unacceptable taste. No hydrolysis of the soy flour or only a partial hydrolysis less than that achieved by following the reaction conditions of this invention gives an unacceptable tasting product as well as a poorly processable ingredient. Only when the soy flour is partially hydrolyzed to the degree as taught herein and further processed to an end product is there obtained an acceptable soy-containing high protein ready-to-eat breakfact cereal.

The degree of hydrolysis of the protein source is basically a function of amount of water present, temperature, time, enzyme level, the particular enzyme used, and the presence of any interfering material.

The proteolytic enzymes useful in the present invention can be selected from any of several known proteolytic enzymes or mixtures thereof extracted from animal, plant, fungal, or microbial sources. A primary consideration in the enzyme or enzyme mixture used is that it must not contribute a significantly objectionable flavor or odor to the final product. Some examples of proteolytic enzymes found effective in the soy flour partial hydrolysis step are papain, pepsin, bromelin, ficin, alcalase, maxitase, thermoase, pronase, and mixtures thereof.

The amount of enzyme added to the reaction mixture is 25 p.p.m. to 2500 p.p.m. based on the dry weight of the soy flour. Greater amounts can be used but exert no measurable beneficial influence on the speed of the hydrolysis reaction. Lesser amounts can also be used but as a practical matter are not because of the length of time it would take for the reaction to proceed to the desired end point. A preferred range of enzyme addition is 100 p.p.m. to 600 p.p.m. based on the dry weight of the soy flour.

The reaction vessel used for the partial hydrolysis reaction is not important in that the reaction can be completed in either a batch type or continuous type operation. If a batch process is used it is preferable to first charge the water to the container and thereafter slowly add a mixture of solid soy flour and enzyme. The addition of water to the solids can be done but creates problems in that the solids set up into hard lumps initially and requires additional work to break them apart for further processing. The amount of water needed for the partial hydrolysis reaction is basically determined by apparatus limitations. That is, lower limit of water is determined by the capability of the mixing equipment. The lower the level of water the more viscous will be the resultant mixture. On the other hand, an excessive amount of water in the partial hydrolysis reaction would necessitate additional work in reducing the water level in subsequent processing steps. The preferred level of water is 50% to 80% based on the total weight of the mixture. The most preferred level of water is 55% to 60% based on the total weight of the mixture. A lower level of water is feasible in the partial hydrolysis reaction provided a continuous type operation is used as discussed hereinafter.

The temperature maintained during the reaction is not critical provided the temperature is not so high as to "kill" the enzyme activity. That is, for proteolytic enzymes, temperatures in excess of 180° F. have the effect of destroying the activity of that enzyme. A temperature range of 80° F. to 160° F. is suitable for the partial hydrolysis reaction with the reaction proceeding faster at the higher temperatures. The most preferred temperature range is 120° F. to 130° F.

The time for the reaction to be completed depends in a large amount on the particular temperature, water level, and enzyme level used. In general, 1 minute to 120 minutes are sufficient to allow the reaction to come to a completion. Times in excess of 120 minutes at a reaction temperature should be avoided in order to prevent more hydrolysis of the soy flour than is desired. Preferably, the hydrolysis reaction is allowed to occur for from 1 minute to 5 minutes.

In the event the protein reaction mixture cannot be processed immediately after makeup it can be stored indefinitely provided certain precautions are taken to prevent further hydrolysis or microbiological spoilage. The proteolytic enzymes of the present invention have a "catalytic" effect at temperatures between 70° F. and 180° F. under the stated hydrolysis conditions and, accordingly, would not be expected to further catalyze the partial hydrolysis reaction at temperatures below 70° F. However, commercially available enzymes frequently are mixtures of enzymes with some of the enzymes being active at lower temperatures. Thus, it is necessary to store the partial hydrolysis reaction mixture at a temperature below 70° F. and preferably below 40° F. if it is not to be used immediately. Storage of the mixture below 40° F. is preferred since this temperature obviates microbiological spoilage. Another method of inactivating the enzyme would be to raise the temperature of the reaction mixture to above 180° F. In the absence of such precautions an over-hydrolyzed protein is possible.

After the soy flour has been partially hydrolyzed, various general processes used for making products of the ready-to-eat breakfast cereal class are utilized for converting the partially hydrolyzed soy flour or dough to the form, type, or condition of the final product desired.

In accord with the preferred process, the partially hydrolyzed soy flour is extruded into strands of a relatively small cross-sectional area and thereafter sliced into small lengths thereby forming small pellet-like particles. These pellet-like particles are next partially dried, if necessary, and formed into flakes. The flakes are then subjected to a puffing operation to transform them into less dense and more porous or tender flakes. Toasting and/or coating operations may be employed to enhance the color and/or flavor of the resultant high protein content cereal product.

The extrusion operation has the effect of forming the dough into a shape easier to handle and more adaptable to existing equipment. Relatively low pressures in the extruder are sufficient for this operation. Pressures within the range of 500 p.s.i.g. to 1000 p.s.i.g. are preferred. Lower pressures can be used but should preferably be avoided since less of a mixing action in the extruder results from the low compressive forces associated with low pressures. Pressures higher than 1000 p.s.i.g. exert little extra benefits and for this reason are avoided. Temperatures employed in the extrusion process are not a critical feature but do have some effect on the handling characteristics of the extrudant, such as stickiness and body. Temperatures falling within the range of 140° F. to 200° F. have been found to be satisfactory.

The shape of the strands that issue from the extruder is determined by the particular extruder die used in the outlet of the extruder and these strands, in turn, greatly influence the shape of the individual particles of the final product. For instance, if the shape of the strand is circular in its cross-sectional area the ready-to-eat cereal made from this strand will have a different shape or configuration than will a cereal product made from strands that are square, triangular, or any other shape in its cross-sectional area. The particular die used in the extruder is a matter of choice dictated primarily by the shape desired for the final product.

The strands that are extruded from the extruder are next cut so as to form pellet-like particles. The choice of the cross-sectional size of the strand issuing from the die and length of cut depends on the size requirement of the final individual piece of cereal. Such parameters are easily determined and need not be set out in detail here.

After pelletizing the pellet-like particles are tempered, if necessary, and run through flaking rolls. Depending on the formulation and process conditions used throughout the process it may be necessary to allow the strands and freshly cut pellets to cool down and/or dry somewhat. This tempering has the effect of reducing the tackiness oftentimes associated with partially processed cereal dough. A hold time of up to 30 minutes is sufficient to temper the strands while a hold time of up to two minutes is sufficient for the freshly cut pellets. With some formulations there may be no sticking problem in which case the strands and/or pellets can pass directly to the next operation without any tempering step.

If a flake-type cereal product is desired, the next step after pelletizing is flaking of the pellets. Flaking is accomplished by passing the pellets between a pair of cooperating rollers or a roller and a flat surface spaced apart a distance sufficient to produce the desired flake thickness. In accord with this invention it has been found that a flake thickness of 7 to 12 mils is sufficient to produce a satisfactory product. As the flakes leave the rolls they are in a dense and relatively hard condition. Such a flake is unacceptable to the average consumer and accordingly, an additional processing step must be taken to produce a lighter, more porous and more tender flake structure.

Breakfast cereals obtain the desired flake structure by a process known as puffing. Puffing of the flake is also quite important in that it enhances the flake's crispness and tenderness. Cereal flakes containing untreated soy protein are difficult to puff but, unexpectedly, soy protein when treated in the manner heretofore described does not act as a hindrance on puffing of a cereal flake of which it forms a part and actually improves puffability. This factor is of importance in that the more porous type flakes have a tendency to be more tender than the less porous or less puffed flake. Additionally, soy flavor is diminished even more in the better puffed of two soy-containing flakes.

Basically, a cereal is puffed by causing trapped moisture in the flake to expand very rapidly from the liquid state to the vapor phase. Rapid heating or a rapid decrease in pressure are the methods commonly used to convert dense hard flakes into the more palatable porous tender flake. Both methods are well known and are commonly used throughout the industry. Gun puffing is an example of the principle of a rapid decrease in pressure. In this process the cereal flakes are first heated under high pressure and then the pressure is rapidly released to achieve the puffing effect. The process disclosed in U.S. Pat. No. 3,253,533 is an example of a rapid heating puffing method.

To achieve the optimum puffing, care must be taken in regard to the initial moisture content of the unpuffed flake. The specific moisture content that is best is dependent on the particular type of puffing process being utilized. For instance, a moisture content of 12% to 14% is best for gun puffing while 10% to 12% is best for puffing by a process that rapidly heats the flake. The optimum moisture content for any one puffing technique can routinely be determined experimentally.

Additional processing steps can be utilized if it is so desired. For instance a toasting operation can be used after the puffing step if it is desired to change the color of the flake to a more desired rich golden brown. Frequently, a slight toasting step also brings out a pleasant toasted flavor note.

In the event the soy flour is partially hydrolyzed by a continuous process utilizing an extruder, the mixture at the end of the hydrolysis reaction is issued from the extruder in the form of strands. These strands are then pelletized and further processed in the same way as are the pellets that are eventually produced from a batch-type partial hydrolysis reaction as above described. For such a continuous partial hdyrolysis, reaction conditions of 80° F. to 160° F., 10 p.s.i.g. to 1000 p.s.i.g., and a residence time of 1 minute to 10 minutes are sufficient. An advantage that a continuous-type partial hydrolysis reaction has over a batch-type reaction is that a reduced water level is adequate to carry out the partial hydrolysis reaction. Using an extruder and the above reaction conditions, 40% to 80% water is used.

In accordance with another and preferred aspect of the present invention, a cereal grain selected from the group consisting of corn, wheat, rice, and oats, and mixtures thereof is admixed with the partially hydrolyzed soy flour and thereafter processed to form a composite final product that still has a high protein content, i.e. greater than 20%. As with the cereal product made from soy flour alone forming the structure of the product, the cereal product comprising treated soy flour and a cereal grain is produced by general processes of cereal manufacture depending on the desired form, type, or condition of the final product.

In the preferred process the additive cereal grain is separately cooked or gelatinized and then mixed with the partially hydrolyzed soy flour to form a dough. This dough is then processed in accord with the preferred process above described with respect to the all soy flour cereal product. That is, the dough is extruded, pelletized, dried if necessary, and puffed. Alternatively, the pellets are flakes prior to the puffing operation to form a flaked product. Toasting and/or a coating operation may be added to the process.

The cooking or gelatinizing of the cereal additive is performed under conditions similar to those commonly used in the industry. Thus, either a batch cooking or continuous cooking operation is used. Different methods of cooking include heating at atmospheric pressure in an agitated kettle, heating at elevated pressure in a tumbling type mixer and heating under high pressure in a continuous mixer-extruder.

The amount of water and temperature needed to gelatinize the grains depends upon the particular grain and the particular method used. The preferred method of gelatinizing the cereal grain is by cooking in an extruder under pressure. Such a process is continuous and can be accomplished with greater ease. Additionally, the use of higher pressures attainable in the extruder allow the use of higher temperatures and also lower water levels than possible with a batch type cooking operation. The use of lower water levels thus minimizes the amount of drying required in subsequent steps. Using an extrusion type process at 100 p.s.i.g. to 200 p.s.i.g. pressure and temperatures in the range of 250° F. to 350° F., 12% to 25% water based on the total mixture is sufficient to gelatinize the cereal grain.

The gelatinized cereal grain can, at this point, be added to the previously partially hdyrolyzed soy flour and further processed to produce the cold cereal product. Preferably, though, the water content of the gelatinized cereal grain is reduced prior to mixing with the partially hydrolyzed protein source. This additional operation is preferred at this point in the process so that subsequent handling and processing operations proceed more smoothly. Excessive moisture levels in the mixture cause subsequently formed individual cereal forms or shapes to lack body or be overly soft and difficult to handle. The amount of moisture present in the cooked cereal grain at the time of addition to the treated soy flour mixture must be relatively low because water still present from the partial hydrolysis of soy flour will contribute significantly to the total moisture content of the mixture. It is preferred that 15% to 30% water be present in the soy flour-cooked grain mixture when the product is being made by the preferred method. Accordingly, to reach the lower water levels often desired, less than 5% water must be present in the cooked cereal grain prior to mixing with the soy flour. If the cereal is gelatinized by the continuous extrusion method under pressure, as in the preferred cooking method, the resultant extrudant may flash dry and thereafter contain less than 5% water and as such would not need the additional drying operation.

Depending on the cooking process used, it may be necessary to first break any lumps of cooked cereal formed during the cooking process so that proper drying, if needed, can be performed. Some cereals, in particular corn, have a tendency to agglomerate during the cooking stage and as a result the lumps are more difficult to dry thoroughly. Any conventional lump-breaker is satisfactory for aiding in making the cooked cereal more susceptible to a thorough drying. If, of course, no lumps or agglomerates were formed or drying is not needed, this operation is eliminated. Various types of equipment are available for the lump-breaking operation and are used with equivalent results.

The cooked cereal grain is now combined with the partially hydrolyzed soy flour to form a dough and thereafter processed in the manner heretofore described with respect to the treated soy flour alone. Corn, rice, oats, and wheat all contain relatively low protein contents that must be accounted for when determining the total protein content of a soy flour-cereal grain cereal product. The approximate protein contents of corn, rice, oats, and wheat are 9%, 7%, 14%, and 12%, respectively. The exact protein content of a cereal grain and of the soy flour are determined by routine methods well known to those skilled in the art. The proportion of soy flour and cereal grain combined together to form an end product having the desired protein content is likewise determined routinely. As disclosed heretofore, a satisfactory ready-to-eat cereal is produced containing all soy flour. On the other hand, the amount of cereal grain added to the soy flour is limited only by the desired requisite of a total protein content of 20%. Especially preferred cereal products are produced if the "base cereal particle," i.e. the cereal particle consisting of soy flour and cereal grain without any additives contains on a dry weight basis the following: 18% to 68% soy flour to 82% to 32% corn; 20% to 70% soy flour to 80% to 30% rice; 10% to 62% soy flour to 90% to 38% oats; and 14% to 64% soy flour to 86% to 36% wheat. Mixtures of the above cereal grains are also blended with soy flour in routinely determined proportions to produce a desired product.

The flakes can also include various materials to improve taste, appearance and/or functional properties. For instance sugar, salt, flavoring, coloring and/or spices can be used in the formulation either in the original dough or as a coating on the puffed flake. Vitamins and minerals can also be included in the formulation to increase the nutritional value of the breakfast food.

Additives such as fatty acids having a carbon chain length of 12 to 24 or salts of the acid can be included in the formulation as a processing aid. Cooked cereal grains have a tendency to be tacky and thereby cause sticking problems with regard to subsequent processing steps using the cooked grain. Cereal particles also have a tendency to agglomerate together during the cooking process thereby necessitating additional processing. The incorporation of 0.1% to 2% of the aforementioned fatty acid salt into the uncooked cereal grain on a dry weight basis reduces the agglomerating problem as well as the sticking or clogging up of processing equipment.

The above preferred processes for making cold cereal products of substantially soy flour and of soy flour blended with a cereal grain have been described in regard to producing a product having a flake-type structure. However, if a puffed sphere-type product is desired the above described preferred processes only have to be modified slightly. After the formation of pellet-type particles and the tempering period, if any is required, the cereal particles are sent directly to the puffing operation, by-passing the flaking roll or rolls. Thus, the only modification in the process described for producing a flake product is the omission of passing the pellet-like particles through the flaking step.

While rice, oats and wheat make a satisfactory product when blended with the partially hydrolyzed soy flour and processed in accordance with this invention, corn is the preferred cereal grain. A cereal dough of corn in admixture with a partially hydrolyzed soy flour forms an especially tasteful and pleasing flake structure when formed into the final cold cereal product.

The following examples are given for the purpose of illustrating the production of the novel cold cereal products. Unless otherwise indicated all percentages given are on a weight basis.

Example 1

Formulation: Grams
Soy flour _____ 92.0
Dextrose _____ 3.0
Papain _____ [1] 0.05

[1] 543 p.p.m. of soy flour.

The dextrose and papain are added to 130 grams of water and blended to form a dispersion. To this dispersion is added the soy flour thereby forming a mixture of 58% water. After mixing, the mixture is held at 120° F. for 5 minutes. Next the mixture or dough is passed through an extruder under 750 p.s.i.g. and having a die outlet temperature of 170° F. The extrudant is in the form of strands having a diameter of about 3/16 inches. These strands are next cut into pellets having a length of about 3/16 inches. These pellets are then passed through a two roll mill to produce a flake shape product having a thickness of about 0.008 inch. These flakes are partially dried to a moisture content of 12% and then puffed. A rapid heating method of puffing is used wherein the flakes are contacted with salt at a temperautre of 330° F. for 10 seconds. After wetting with milk the flakes are evaluated.

Flakes made by the above process and formulation with the exception of no enzyme addition are used as a control. They are tough, leathery and hard to chew after exposure to water.

Flakes made by the above formulation and process are considerably less tough than the control and disintegrated fairly easily in the mouth. The flakes are also more porous, less dense, and accordingly better puffed than the control flakes.

Example II

Flakes made by the above process but containing bromelain in place of papain at an equal level are made. These flakes after exposure to water are very significantly less tough than the control flakes, disintegrated very easily in the mouth, and have no off-flavor.

Example III

Flakes made by the process of Example I but containing ficin in place of the papain at an equal level are made. These flakes after exposure to water are equal to the flakes of Example II in regard to their tenderness and taste.

Example IV

Pepsin when used in the formulation of Example I in place of papain at the same level and when processed into flakes resulted in flakes that are less tough than the control after exposure to water.

Example V

A breakfast cereal product is made having a puffed particle shaping as opposed to flakes by a process very similar to that described in Example I. The exact formulation and process of Example I is used up to the point of passing the particles through the two-roll mill. At this point the pellets are partially dried to a moisture content of 10% and then puffed. The partially dried pellets are exposed to salt at a temperature of 325° F. for 5 seconds, thereby producing a puffed type product. No problems are encountered in puffing.

Example VI

Formulation: Grams
Soy flour _____ 678
Dextrose _____ 80
Papain _____ [1] 0.10
Brewer's grits _____ 1600

[1] 147 p.p.m. of soy flour.

The dextrose and papain are added to 930 grams of water to form a dispersion. To this dispersion is added the soy flour having a protein content of 60%. The mixture having a moisture content of 55% is then held at 125° F. for 2 minutes to cause a partial hydrolysis of the soy protein. The brewer's grits (corn) having 9% protein is separately cooked in an extruder. The brewer's grits and 400 grams of water are blended to form a 20% water content mixture and fed into an extruder. Under a pressure of 150 p.s.i.g. and a temperature of 325° F. the corn is passed through the extruder thereby effecting the gelatinization. This cooked corn is then run through a hammermill to break up lumps and prepare the corn for drying. The cooked corn is partially dried to a moisture content of 5%. The partially dried cooked corn and partially hydrolyzed soy flour is now blended to form a dough. This dough is introduced into an extruder and extruded into the form of strands having a diameter of about 3/16 inch. The dough in the extruder is subjected to 800 p.s.i.g. and 180° F. The strands are tempered for about 20 minutes and then sliced to form pellets having a length of about 3/16 inch. These pellets are next formed into flakes by passing them through a two-roll mill. The resultant flakes have a 0.010 inch thickness. After partially drying the flakes to a moisture content of 12% they are puffed to form the final product. Puffing is achieved by contacting the unpuffed flakes with hot salt at a temperature of 320° F. for 10 seconds.

Flakes made by the above process when compared to flakes made similarly but with no enzyme treatment are more tender after exposure to milk, have a more pleasant taste, and are better puffed.

What is claimed is:

1. A highly nutritious and palatable ready-to-eat breakfast cereal wherein the protein content is at least 20%, said cereal containing soy flour which has been partially hydrolyzed by a proteolytic enzyme, the amount of said enzyme and the time of said hydrolysis being sufficient to provide improved tenderness and crispness retention in the final cereal product.

2. The ready-to-eat cereal product of claim 1 wherein the soy flour has been partially hydrolyzed by reacting it with water in the presence of a proteolytic enzyme at 80° F. to 160° F. for 1 minute to 120 minutes.

3. The ready-to-eat breakfast cereal of claim 2 further containing a cooked cereal grain selected from the group consisting of corn, oats, wheat, rice, and mixtures thereof.

4. The ready-to-eat breakfast cereal of claim 3 wherein the cooked cereal grain is corn.

5. A process for making a highly nutritious and palatable ready-to-eat breakfast cereal, wherein the protein content is at least 20%, comprising
   (a) reacting soy flour with water in the presence of a proteolytic enzyme at 80° F. to 160° F. thereby causing a partial hydrolysis of the soy flour, the amount of said enzyme and the time of said hydrolysis being sufficient to provide improved tenderness and crispness retention in the final cereal product;
   (b) extruding the partially hydrolyzed soy flour into a strand;

(c) slicing the strand into pellets; and (d) puffing the pellets to form a ready-to-eat breakfast cereal.

6. The process of claim 5 wherein the soy flour is reacted with the water for 1 minute to 120 minutes.

7. The process of claim 6 wherein the proteolytic enzyme is present in an amount ranging from 25 p.p.m. to 2500 p.p.m. by weight of the soy flour.

8. The process of claim 7 wherein the proteolytic enzyme is selected from the group consisting of papain, pepsin, bromelain, ficin, alcalase, maxitase, thermoase, pronase, and mixtures thereof.

9. The process of claim 8 wherein the proteolytic enzyme is papain.

10. The process of claim 7 further comprising flaking the pellets prior to puffing.

11. The process of claim 7 further comprising blending a cooked cereal grain with the partially hydrolyzed soy flour to form a dough prior to extrusion.

12. The process of claim 11 wherein the cooked cereal grain is selected from the group consisting of corn, oats, wheat, rice, and mixtures thereof.

13. The process of claim 12 wherein the cooked cereal grain is corn.

14. The process of claim 13 further comprising flaking the pellets prior to puffing.

References Cited

UNITED STATES PATENTS

| | | | |
|---|---|---|---|
| 2,436,519 | 2/1948 | Luke | 99—83 |
| 2,478,438 | 8/1949 | Thompson et al. | 99—82 |
| 3,585,047 | 6/1971 | Ferjimaaki et al. | 99—98 |

OTHER REFERENCES

Markley: "Soybeans and Soybean Products," vol. 1 1950, Interscience Publishers, Inc., N.Y., p. 344.

RAYMOND N. JONES, Primary Examiner

U.S. Cl. X.R.

99—17